(No Model.)
W. G. HUNTER.
HAY OR GRAIN UNLOADER.
No. 397,551. Patented Feb. 12, 1889.
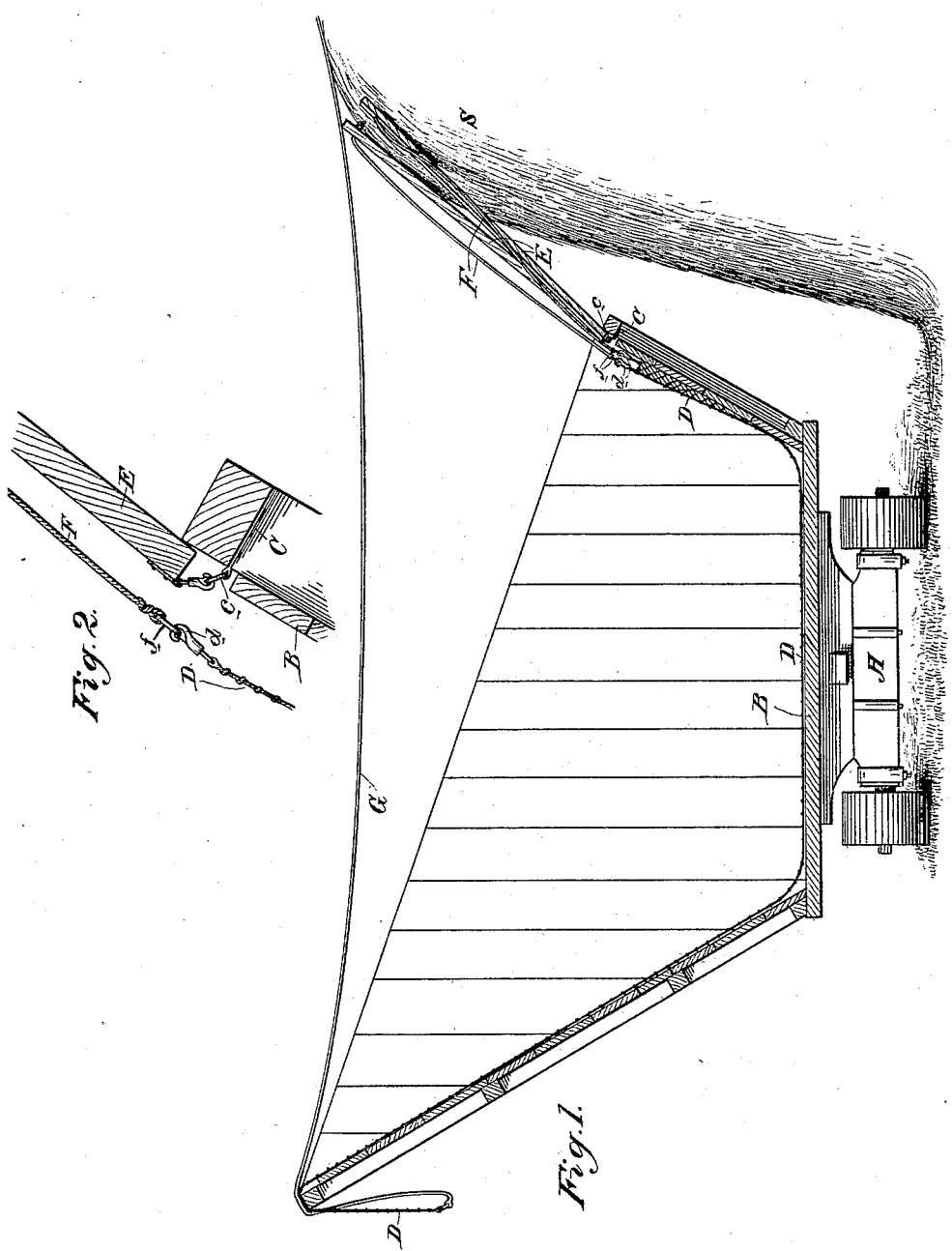
Witnesses,
Geo. H. Strong
J. A. Nurse
Inventor,
Wm. G. Hunter
By Dewey & Co.
Attys

United States Patent Office.

WILLIAM G. HUNTER, OF TRAVER, CALIFORNIA.

HAY OR GRAIN UNLOADER.

SPECIFICATION forming part of Letters Patent No. 397,551, dated February 12, 1889.

Application filed June 29, 1888. Serial No. 278,586. (No model.)

*To all whom it may concern:*

Be it known that I, WILLIAM G. HUNTER, of Traver, Tulare county, State of California, have invented an Improvement in Hay or Grain Unloaders; and I hereby declare the following to be a full, clear, and exact description of the same.

My invention relates to that class of unloading devices in which the grain or hay is contained within a net placed in the bed of the wagon, and is operated by means of ropes which roll it and its contents out of the wagon-bed and up on the top of the stack; and my invention consists in the constructions and combinations of devices which I shall hereinafter fully describe and claim.

The object of my invention is to simplify the unloading process by avoiding the employment of the usual complicated system of ropes and the inconvenience of their rearrangement after each operation, and to provide an ordinary header-wagon with a simple and readily-applicable unloading mechanism.

Referring to the accompanying drawings for a more complete explanation of my invention, Figure 1 is a cross-section of a header-wagon bed and net, showing the application of my unloader to them. Fig. 2 is an enlarged detail view of the attachment of the unloader to the wagon-bed and net.

A is the running-gear of the wagon, and B is its body or bed. This bed is here represented as that of a header-wagon, which, as is well known, is a vehicle which accompanies the header and receives the grain from its elevator, and thence carries it to the stack. The beds of these wagons are made, as shown, with one low side, so as to easily fill it and discharge it, and it is usual in these beds to secure to the top of its low sides straps C, provided with rings $c$, with which it is customary to engage the snaps $d$ along one edge of the net D. This net lies in the bottom of the bed and hangs over its high side.

In the method commonly employed to unload the hay or grain there are ropes called "extensions," which are laid across the stack and reach over to a stake on the back. A pole or bar holds these ropes apart. The extension-ropes have rings, and when about to unload the snaps $d$ on the low side of the net are released from rings $c$ and are hooked to the rings of the extension-ropes. A pull-rope is placed across the stack in the same direction as the extensions and its end is secured to the overhanging high side of the net, which is now thrown over the load. Then the pull-rope is hauled on and the net with its load is roller over and over, going across the stack, and the wagon is driven around to the back and takes in the net. To do away with these extension-ropes I have the following: When about to unload, I disengage the snaps $d$ of the net from the rings $c$ of the straps, and I secure to the said rings a number of independent bars or poles, E, the lower ends of which rest upon the top of the low side of the wagon-bed. Their flexible connection forms a hinge which enables them to accommodate themselves to any angle as they lie against the gradually-forming stack, and, being independent, each can conform itself exactly to its position. To the upper ends of these bars or poles are secured ropes F, which hang downwardly on their inner sides and are provided with rings $f$ on their lower ends. With these ends the snaps $d$ of the net D engage, so that said net, instead of being directly connected, as usual, with the top of the low side of the header-bed, is indirectly connected with said top through the intervention of the ropes and the poles or bars, which are themselves hinged or flexibly connected with the top of the low side of the header-bed. Ropes G are connected with the overhanging edge of the net, and these ropes are carried over the stack S. The operation is obvious. The ropes, when pulled on, cause the net to gradually reverse itself, the limit of its upward movement being as high as the tops of the poles or bars, thereby discharging the load directly on top of the stack.

When this attachment is not used, the poles or bars may be readily unsnapped from the straps of the header-wagon bed, and the attached ropes F may be released from the net and the whole device either deposited in the bed of the wagon or otherwise disposed of.

Having thus described my invention, what I claim as new, and desire to secure by Letters Patent, is—

1. In a grain or hay unloader, and in combination with the wagon-bed and the net therein, the poles or bars connected with the top of one side of the wagon-bed and adapted to rest against the stack, and the ropes connected with the top of the poles or bars and with one edge of the net, substantially as herein described.

2. In a grain or hay unloader, and in combination with the wagon-bed and the net therein, the poles or bars hinged to or flexibly connected with the top of one side of the wagon-bed and adapted to rest at any angle against the stack, and the ropes connected with the tops of the poles or bars and with the edge of the net, substantially as herein described.

3. In a grain or hay unloader, and in combination with the wagon-bed having straps, and the net in said bed having snaps along its edge, the separate poles or bars connected with the straps and adapted to rest against the stack, and the ropes connected with the tops of the poles or bars, and having rings on the lower ends engaging the snaps on the edge of the net, substantially as herein described.

In witness whereof I have hereunto set my hand.

WILLIAM G. HUNTER.

Witnesses:
W. J. APPLEGATE,
P. Y. BAKER.